United States Patent
Vydrin

(10) Patent No.: US 7,638,776 B2
(45) Date of Patent: Dec. 29, 2009

(54) STAGGERED ARRAY IMAGING SYSTEM USING PIXILATED RADIATION DETECTORS

(75) Inventor: Viatcheslav Vydrin, Pittsburgh, PA (US)

(73) Assignee: Endicott Interconnect Technologies, Inc., Endicott, NY (US)

(*) Notice: Subject to any disclaimer, the term of this patent is extended or adjusted under 35 U.S.C. 154(b) by 34 days.

(21) Appl. No.: 11/888,843

(22) Filed: Aug. 2, 2007

(65) Prior Publication Data

US 2008/0135765 A1 Jun. 12, 2008

Related U.S. Application Data

(60) Provisional application No. 60/839,007, filed on Aug. 21, 2006.

(51) Int. Cl.
*G01T 1/00* (2006.01)
(52) U.S. Cl. .................................. 250/370.09
(58) Field of Classification Search .............. 378/57, 378/146; 250/370.09
See application file for complete search history.

(56) References Cited

U.S. PATENT DOCUMENTS

| | | |
|---|---|---|
| 4,432,017 A | 2/1984 | Stoffel et al. |
| 5,939,724 A | 8/1999 | Eisen et al. |
| 6,035,013 A * | 3/2000 | Orava et al. .................. 378/37 |
| 7,027,561 B2 * | 4/2006 | Francke et al. .............. 378/146 |
| 7,102,137 B2 * | 9/2006 | Hoffman .................. 250/369 |
| 2002/0018543 A1 * | 2/2002 | Danielsson ................ 378/98.8 |
| 2004/0004189 A1 | 1/2004 | Brahme et al. |
| 2005/0061985 A1 | 3/2005 | Hoffman |
| 2005/0247882 A1 | 11/2005 | Wear et al. |
| 2005/0249331 A1 | 11/2005 | Wear et al. |
| 2005/0253079 A1 | 11/2005 | Hoffman |
| 2005/0259783 A1 | 11/2005 | Hoffman |

FOREIGN PATENT DOCUMENTS

WO   03069371 A1   8/2003

* cited by examiner

*Primary Examiner*—Constantine Hannaher
(74) *Attorney, Agent, or Firm*—Hinman, Howard & Kattell; Mark Levy

(57) ABSTRACT

A radiation detection/imaging system includes a first set of radiation detectors spaced from each other in a first direction and a second set of radiation detectors spaced from each other in the first direction. The second set of radiation detectors is positioned laterally adjacent the first set of radiation detectors and the radiation detectors of the first and second sets of radiation detectors are arranged in an alternating or staggered pattern in the first direction. A composite image can be formed of the passage of radiation through an object acquired by the first and second sets of radiation detectors as the object is translated by the first and second sets of radiation detectors.

14 Claims, 5 Drawing Sheets

STAGGERED ARRAY IMAGING SYSTEM USING PIXILATED RADIATION DETECTORS

CROSS REFERENCE TO RELATED APPLICATION

This application claims priority from U.S. provisional patent application No. 60/839,007, filed Aug. 21, 2006, which is incorporated herein by reference.

BACKGROUND OF THE INVENTION

1. Field of the Invention

The present invention relates to radiation detection or inspection systems and, more particularly, to radiation detector arrays and corresponding collimators for use in said inspection systems.

2. Description of Related Art

Many radiation inspection systems employ CZT, CdTe, Ge or other types of radiation-sensitive semiconductor detectors assembled into linear arrays for the purpose of converting radiation impinging on said detectors into corresponding electrical signals.

There are known inspection systems having radiation detectors where all of the pixels (or radiation detection elements) thereof are arranged in single or multiple rows and all detectors are arranged in a single line (a linear array) to cover a scanning area cross section where a radiation pattern is defined by radiation passing through a single slot collimator disposed in the path of the radiation for improving image quality and resolution.

More specifically, heretofore, radiation detectors of inspection systems were arranged into linear arrays with a single slot collimator above them. In order to keep pixel pitch constant and to allow gaps in between the detectors, the edge pixels of each detector were made undersized and a guard band was only provided along the two sides of the detector, leaving exposed unguarded edge pixels on either end of the detector. Due to differences in pixel width, electric field geometry inside the detector and pixel surrounding conditions, edge pixels exhibited different performance versus internal pixels. Edge pixels have also been observed to be prone to instability and performance degradation due to changes to the detector sides over time and increase leakage current.

Heretofore, traditional radiation detectors were placed very close to each other, e.g., end-to-end, to maintain pixel pitch across the array. This arrangement, however, often presents the technical challenge and risk of damaging adjacent detectors during installation or due to thermal expansion.

It would, therefore, be desirable to provide a radiation inspection system that has a new arrangement of radiation detectors that avoids the above problems and others, as well as a collimator for use with such new detector array. Still other advantages of the present invention will become apparent to those of ordinary skill in the art upon reading and understanding the following detailed description.

SUMMARY OF THE INVENTION

An embodiment of a radiation detection/inspection system includes a first set of radiation detectors spaced from each other in a first direction and a second set of radiation detectors spaced from each other in the first direction. The second set of radiation detectors is positioned laterally adjacent the first set of radiation detectors. The radiation detectors of the first and second sets of radiation detectors are arranged in an alternating or staggered pattern in the first direction.

Each radiation detector can include a first plurality of pixels spaced from each other in the first direction. Adjacent pixels of each radiation detector can be spaced from each other by a first distance in the first direction. The radiation detectors can be positioned whereupon one pixel of a radiation detector of the first set of radiation detectors and one pixel of a radiation detector of the second set of radiation detectors are spaced the first distance from each other in the first direction.

Each radiation detector can include a second plurality of pixels spaced from each other in the first direction. The second set of pixels can be positioned laterally adjacent the first set of pixels. The first and second sets of pixels of each radiation detector can be arranged in an alternating or staggered pattern in the first direction.

A radiation detector of the second set of radiation detectors can be positioned adjacent each space between adjacent radiation detectors of the first set of radiation detectors. A radiation detector of the first set of radiation detectors can be positioned adjacent each space between adjacent radiation detectors of the second set of radiation detectors.

The extent or length of each space in the first direction can be less than the extent or length in the first direction of the radiation detector positioned next to the space.

The ends of each radiation detector positioned next to a space can be positioned adjacent the radiation detectors that define the space.

The system can further include a collimator having first and second sets of slots having a pattern corresponding to the pattern of the first and second sets of radiation detectors. A radiation source can be provided that is operative for outputting radiation. The collimator is desirably positioned in the path of the output radiation such that each radiation detector can receive radiation from the radiation source via one slot of the collimator.

The system can include a transport system for translating a specimen in a direction laterally to the first direction between the radiation source and the radiation detectors. A controller can be operative for acquiring the output of each radiation detector and for forming from the acquired outputs a composite image of the passage of radiation through the object.

Desirably, the radiation detectors are encountered in the following order moving in the first direction: a first radiation detector of the first set of radiation detectors; a first radiation detector of the second set of radiation detectors; a second radiation detector of the first set of radiation detectors; and a second radiation detector of the second set of radiation detectors.

The system can include a third set of radiation detectors spaced from each other in the first direction. The third set of radiation detectors can be positioned laterally adjacent the second set of radiation detectors on a side thereof opposite the first set of radiation detectors. The radiation detectors of the second and third sets of radiation detectors can be arranged in an alternating or staggered pattern in the first direction. The collimator can have first, second and third sets of slots having a pattern corresponding to the pattern of the first, second and third sets of radiation detectors.

Where the system includes the third set of radiation detectors, the radiation detectors are desirably encountered in the following order moving in the first direction: a first radiation detector of the first set of radiation detectors; a first radiation detector of the second set of radiation detectors; a first radiation detector of the third set of radiation detectors; a second radiation detector of the first set of radiation detectors; a second radiation detector of the second set of radiation detectors; and a second radiation detector of the third set of radiation detectors.

Another embodiment radiation detection system includes a plurality of radiation detectors disposed along at least two parallel paths in a staggered pattern. Each radiation detector includes at least one line of spaced pixels that runs parallel to the paths. Adjacent pixels of each line thereof are spaced from each other by a first distance in a direction parallel to the paths. At least one pixel of a radiation detector of the first set of radiation detectors and at least one pixel element of a radiation detector of the second set of radiation detectors are positioned either (1) the first distance from each other in a direction parallel to the paths or (2) in a staggered manner in the direction parallel to the paths.

A collimator is disposed between a radiation source and the plurality of radiation detectors. The collimator has a plurality of slots for the passage of radiation from the radiation source to the plurality of radiation detectors, with each slot for the passage of radiation to one radiation detector.

A transport system is provided for translating an object between the radiation source and the plurality of radiation detectors in a direction laterally to the direction of the paths.

A controller is provided that is operative for acquiring the output of each pixel of the radiation detectors and for forming from the acquiring outputs a composite image of the passage of radiation through the object.

The radiation detectors along each path can be spaced from each other. Adjacent a space between at least one pair of adjacent radiation detectors disposed along a first one of the paths, a radiation detector disposed along a second one of the paths can be positioned.

A method of forming a composite image of the passage of radiation through an object acquired from a plurality of radiation detectors disposed in the path of the radiation in an alternating or staggered pattern about an imaginary line includes: (a) causing the object to pass through the radiation path transverse to the imaginary line such that the radiation passes through the object and is detected by the radiation detectors; (b) for each of one or more first parts of the object, acquiring data regarding the passage of radiation through the first part from a radiation detector disposed on one side of the imaginary line at a time t1; (c) for each of one or more second parts of the object, acquiring data regarding the passage of radiation through the second part from a radiation detector disposed on the other side of the imaginary line at a time t2; (d) combining the data acquired in steps (b) and (c) to obtain a composite image of the passage of radiation through a section of the object that includes the first and second parts. The section of the object can be a slice of the object that runs parallel to the imaginary line.

DETAILED DESCRIPTION OF THE INVENTION

Embodiments of the invention will described with reference to the accompanying figures.

Figure 1:
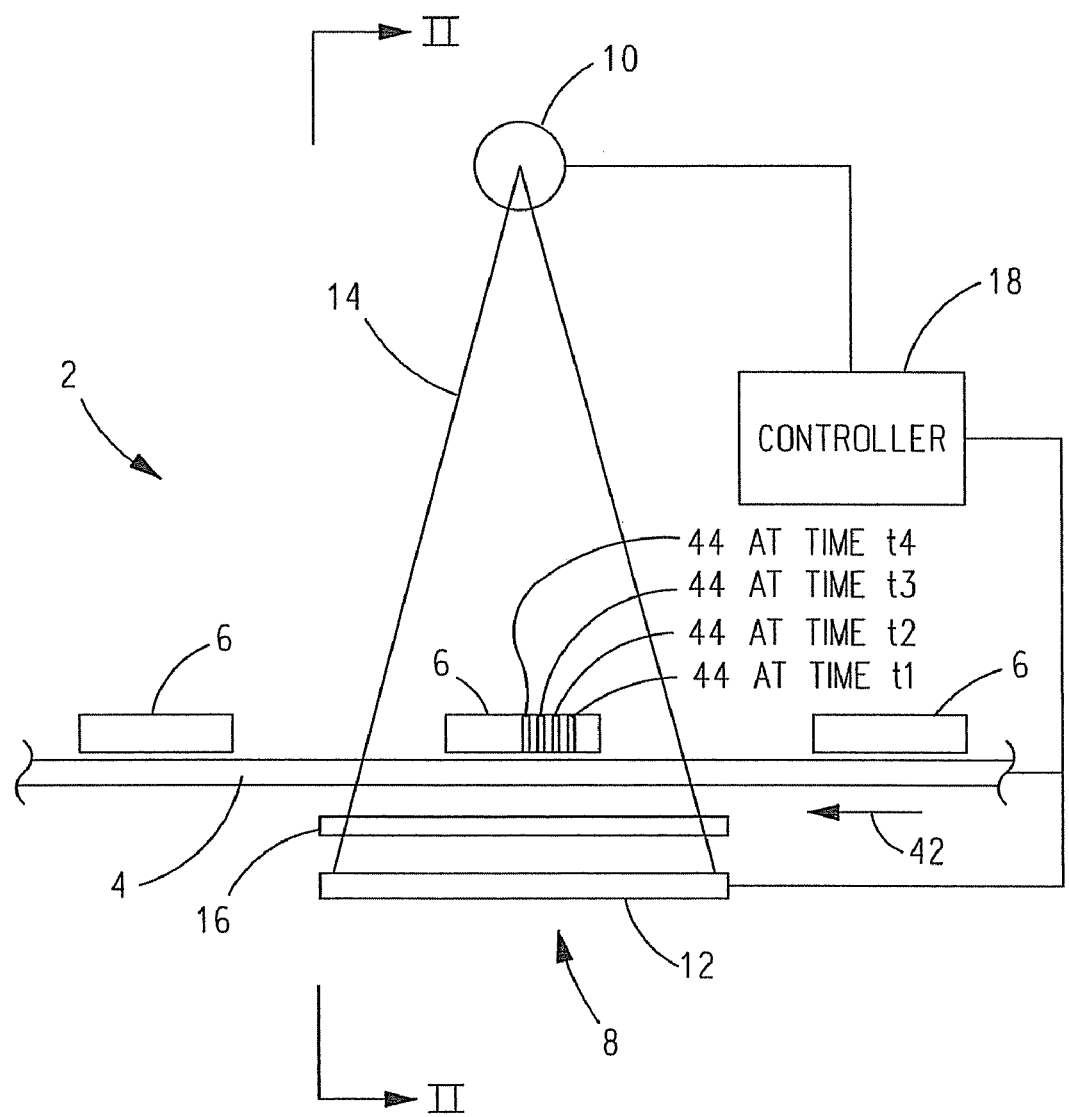
FIG. 1 is a side elevation schematic view of a radiation detection/inspection system in accordance with the present invention.

With reference to FIG. 1, a radiation detection/inspection system 2 includes a transport system, such as a conveyor belt 4, for translating a specimen, such as packaged or unpackaged food product 6, through an inspection station 8. The embodiments of the invention will be described with reference to the specimen being food product 6 and to the transport system being a conveyor belt 4. However, this is not to be construed as limiting the invention.

Figure 2:
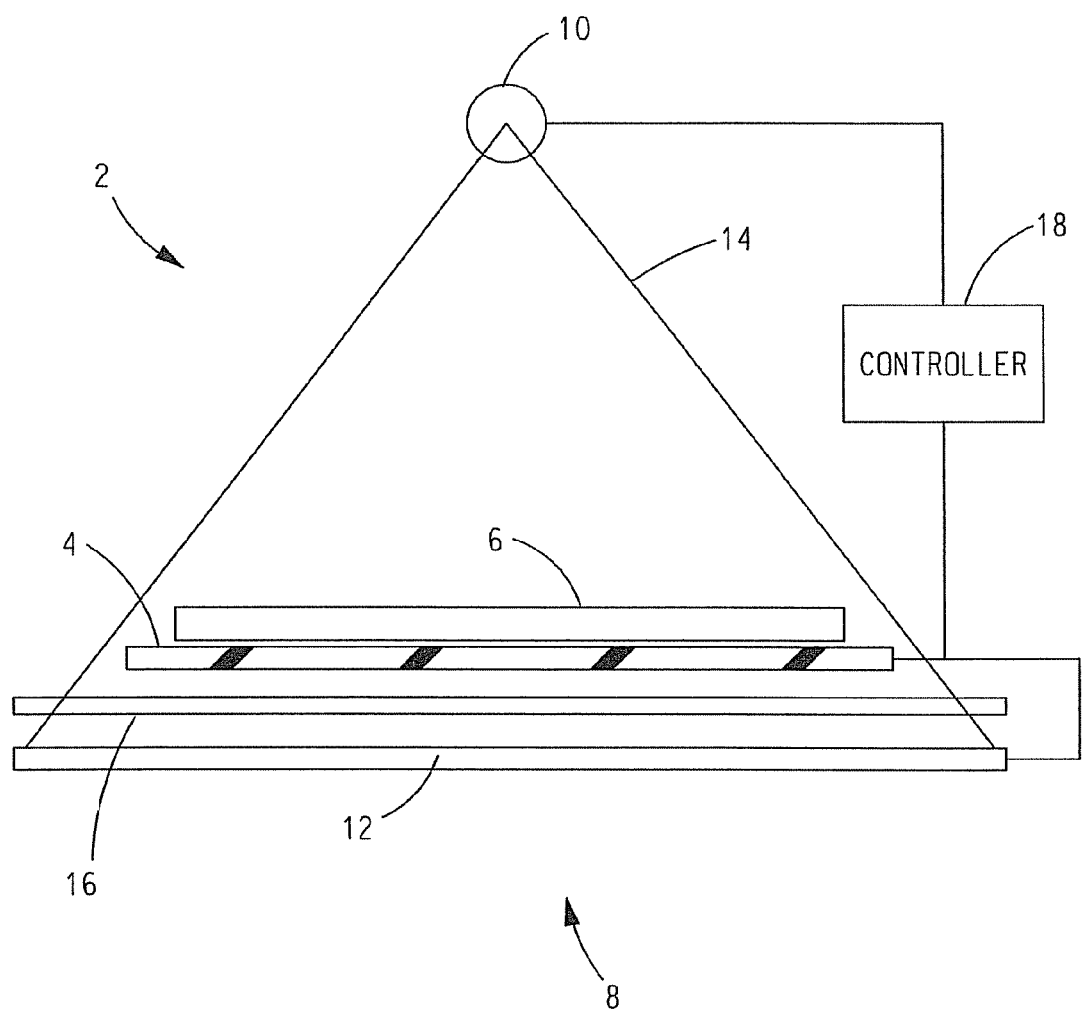
FIG. 2 is a section taken along lines II-II in FIG. 1.

With reference to FIG. 2 and with continuing reference to FIG. 1, inspection station 8 includes a radiation source 10 and a detector array 12 positioned on opposite sides of conveyor belt 4. In FIG. 1, radiation source 10 and detector array 12 are shown positioned above and below, respectively, conveyor belt 4. However, this is not to be construed as limiting the invention since the positions of radiation source 10 and detector array 12 can be reversed, if desired.

Detector array 12 is desirably positioned in a transmission path 14 of radiation output by radiation source 10. For purpose of food inspection, food product 6 translated by conveyor belt 4 passes completely through transmission path 14 during inspection of food product 6. The illustration of the size and shape of transmission path 14 in FIGS. 1 and 2 is not to be construed as limiting the invention. Food product 6 can either be in the form of one or more discreet masses of food product 6, as shown in FIG. 1, or a continuous mass of food product 6 on conveyor belt 4.

In order to shape, focus and restrict the radiation that impinges on detector array 12, inspection station 8 can include a collimator 16 positioned between food product 6 and detector array 12.

One or more controllers 18 can be provided and operative for controlling the operation of conveyor belt 4, radiation source 10, and/or for detecting and processing radiation events detected by the radiation detection elements or pixels (described hereinafter) of detector array 12. The depiction in FIGS. 1 and 2 of a single controller 18 coupled to conveyor belt 4, radiation source 10 and detector array 12 is not to be construed as limiting the invention since it is envisioned that any number of controllers 18, operating independently or in coordination with each other, can be utilized.

Signal processing electronics (not specifically shown) can be provided as standalone components, as an integral part of detector array 12, as an integral part of controller 18, or some combination thereof, as desired. In response to radiation, such as, without limitation, an x-ray, a gamma ray or an ionizing particle, from radiation source 10 striking one of the pixels of detector array 12, a charge is generated that is proportional to the energy of the radiation event. The charge generated in each pixel is output thereby as a current or voltage pulse which is processed by the signal processing electronics. For each pixel, the signal processing electronics determines the energy of the radiation event and, for all of the pixels, accumulates the number of radiation events occurring during a sample interval of time into a window or frame that can be processed along with other windows or frames by controller 18 into an image of the radiation impinging upon detector array 12. Inasmuch as suitable signal processing electronics are well known in the art, they will not be described herein for the purpose of simplicity.

Figure 3A:
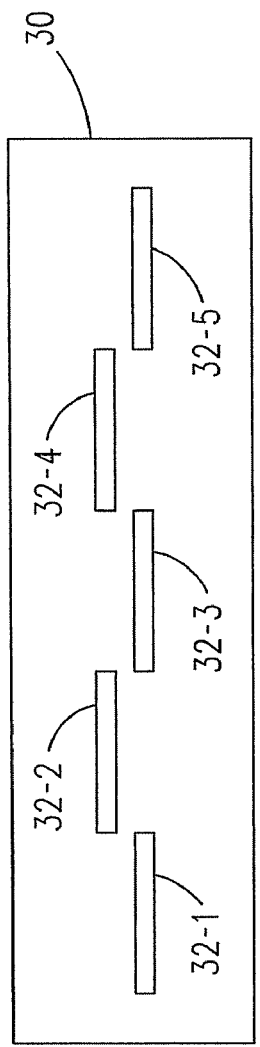
FIGS. 3a and 3b are a first embodiment collimator and a first embodiment radiation detector array for use with the inspection system of FIGS. 1 and 2.
Figure 3B:
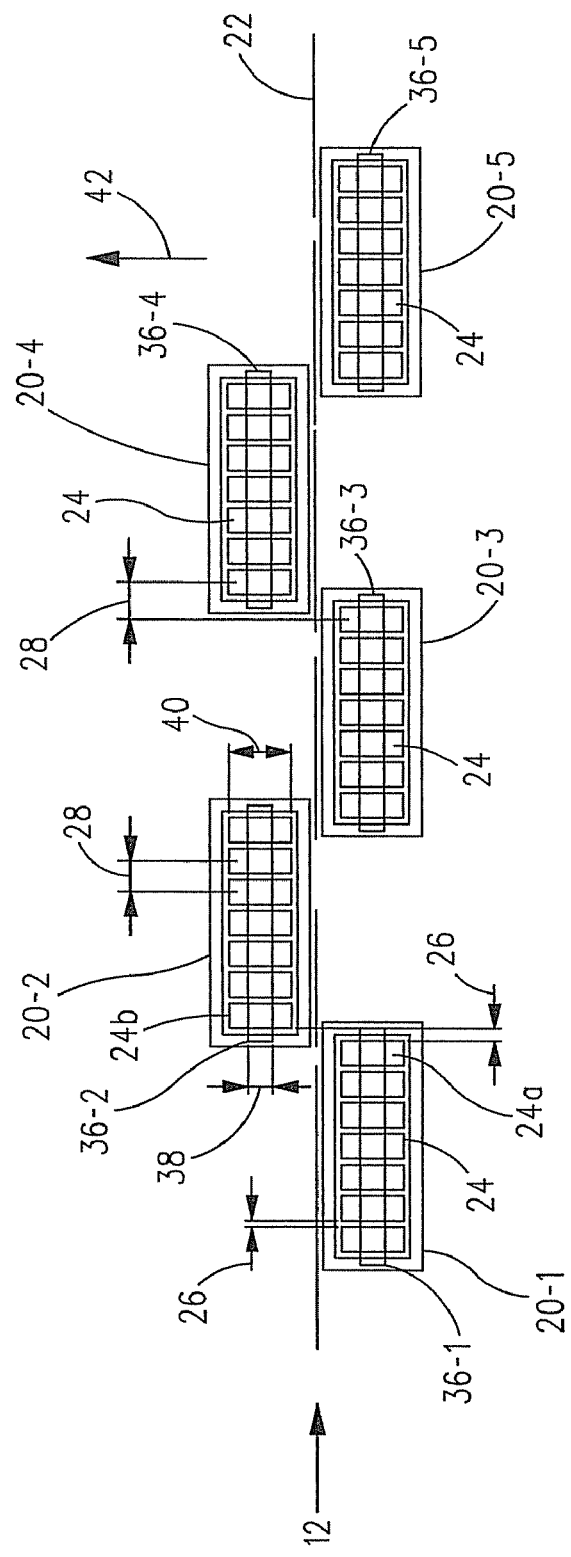

With reference to FIGS. 3a and 3b, a first embodiment collimator 16 and a first embodiment detector array 12 are shown. The first embodiment detector array 12 shown in FIG. 3b includes a plurality of detectors 20 arranged in an alternating or staggered pattern on opposite sides of a line 22 (shown in phantom). More specifically, the first embodiment detector array 12 includes a first set of radiation detectors 20-1, 20-3 and 20-5 spaced end-to-end from each other in a direction parallel to line 22 on a first side thereof and a second set of radiation detectors 20-2 and 20-4 spaced end-to-end from each other in a direction parallel to line 22 on a second side thereof.

Each radiation detector 20 includes a plurality of similarly sized pixels 24 spaced from each other side-to-side in a direction parallel to line 22. Adjacent pixels 24 of each radiation detector 20 are spaced from each other by a gap of distance 26 in the direction of line 22. In addition, radiation detectors 20-1 through 20-5 are positioned whereupon at least one pixel 24 of each radiation detector 20 of the first set of radiation detectors (20-1, 20-3 and 20-5) and at least one pixel 24 of each radiation detector 20 of the second set of radiation detectors (20-2 and 20-4) are positioned distance 26 away from each other in the direction of line 22. For example, as shown in FIG. 3b, the right edge of pixel 24a of radiation detector 20-1 and the left edge of pixel 24b of radiation detector 20-2 are positioned distance 26 away from each other in the direction of line 22. Hence, when moving parallel to line 22 from left to right, or vice versa, the center-to-center distance from one pixel 24 to an adjacent pixel 24 is a distance 28. This center-to-center distance 28 will be the same regardless of whether adjacent pixels 24 are associated with a single radiation detector or a pair of adjacent radiation detectors, e.g., 20-1 and 20-2; 20-2 and 20-3; 20-3 and 20-4, etc.

The first embodiment collimator 16 shown in FIG. 3a includes a plate 30 made of any suitable and/or desirable material that is capable of blocking the passage of radiation traversing transmission path 14. Plate 30 includes a plurality of slots 32-1 through 32-5 arranged in the same alternating or staggered pattern as detectors 20-1 through 20-5, respectively.

In use, plate 30 is positioned such that radiation traversing transmission path 14 passes through slots 32-1 through 32-5 and impinges on detectors 20-1 through 20-5 with radiation patterns 36-1 through 36-5, respectively. As can be seen, each radiation pattern 36 has a width 38 that fits within a dimension 40 of each pixel 24 that runs perpendicular to line 22.

The operation of inspection system 2 with the first embodiment collimator 16 and the first embodiment detector array 12 shown in FIGS. 3a and 3b, respectively, will now be described.

In operation, conveyor belt 4 translates food product 6 through radiation transmission path 14 in the direction shown by arrow 42 in FIGS. 1 and 3b.

At a time t1 when a slice 44 of food product 6 is positioned in the path of radiation that traverses transmission path 14 and forms radiation patterns 36-1, 36-3 and 36-5, the outputs of pixels 24 of radiation detectors 20-1, 20-3 and 20-5 are sampled.

At a time t2, after conveyor belt 4 has translated slice 44 of food product 6 to a position where said slice 44 is positioned in the path of radiation that traverses transmission path 14 and forms radiation patterns 36-2 and 36-4, the outputs of pixels 24 of radiation detectors 20-2 and 20-4 are sampled. The samples of the outputs of pixels 24 of radiation detectors 20-1, 20-3 and 20-5 sampled at time t1 are combined or merged with the samples of the outputs of pixels 24 of detectors 20-2 and 20-4 sampled at time t2 to obtain a composite image of the radiation that passes through slice 44 as it moves through transmission path 14.

More specifically, by way of appropriate imaging software, controller 18 can assemble a composite image of slice 44 from the thus sampled outputs of pixels 24 of radiation detectors 20-1 through 20-5 acquired at times t1 and t2.

To facilitate controller 18 forming a composite image of each slice of food product 6, suitable means, such as an encoder and/or a resolver, (not shown) is/are coupled to controller 18 and conveyor belt 4 for accurately detecting the movement and/or speed of conveyor belt 4. Armed with knowledge of the position and/or speed of conveyor belt 4, controller 18 can be operative for acquiring and combining images of different portions of the same slice acquired at different times (e.g., t1 and t2) into the composite image of said slice.

In a similar manner, based on information regarding the position and/or speed of conveyor belt 4, controller 18 can be operative for acquiring and assembling images of a plurality of adjacent slices of food product 6 into a composite image of food product 6. Thus, in addition to assembling composite images of each slice of food product 6, controller 18 can assemble a composite image of all or a portion of food product 6 from the images of the slices of food product 6 acquired and assembled by controller 18.

A benefit of the alternating or staggered pattern of radiation detectors 20-1 through 20-5 in FIG. 3b is that the gap of distance 26 is the same between each pair of adjacent pixels 24 in the direction of line 22 regardless if the pixels are on the same radiation detector, e.g., 20-1, or on different radiation detectors, e.g., 20-1 and 20-22. Hence, the quality of the composite image formed for each slice of food product 6 is improved over a linear arrangement of detectors 20-1 through 20-5, wherein a larger gap would exist between adjacent edge or end pixels of adjacent detectors 20, or wherein the end pixels are made undersized as described above. For example, suppose radiation detectors 20-1 and 20-2 in FIG. 3b are positioned end-to-end. In this case, the gap or distance between the rightmost edge of pixel 24a and the leftmost edge of pixel 24b would be greater than distance 26. Because of the larger size of this gap, it is possible that unwanted material in food product 6 that is in the radiation traversing transmission path 14 that falls on this gap will not have a pixel 24 for detecting its presence, hence, compromising inspection of the food product 6. The first embodiment detector array 12 and collimator 16 shown in FIGS. 3b and 3a, respectively, overcome this problem by having the uniform distance 26 between adjacent pixels 24 moving from left-to-right, or vice versa, parallel to line 22.

Figure 4A:
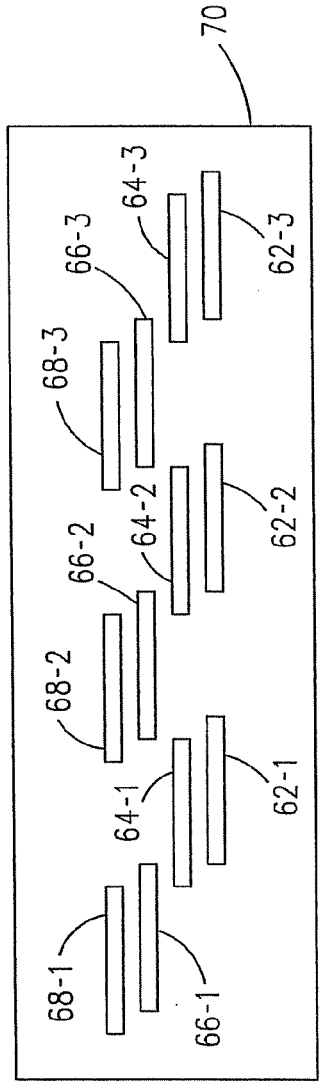
FIGS. 4a and 4b are a second embodiment collimator and a second embodiment radiation detector array for use with the inspection system shown in FIGS. 1 and 2.
Figure 4B:
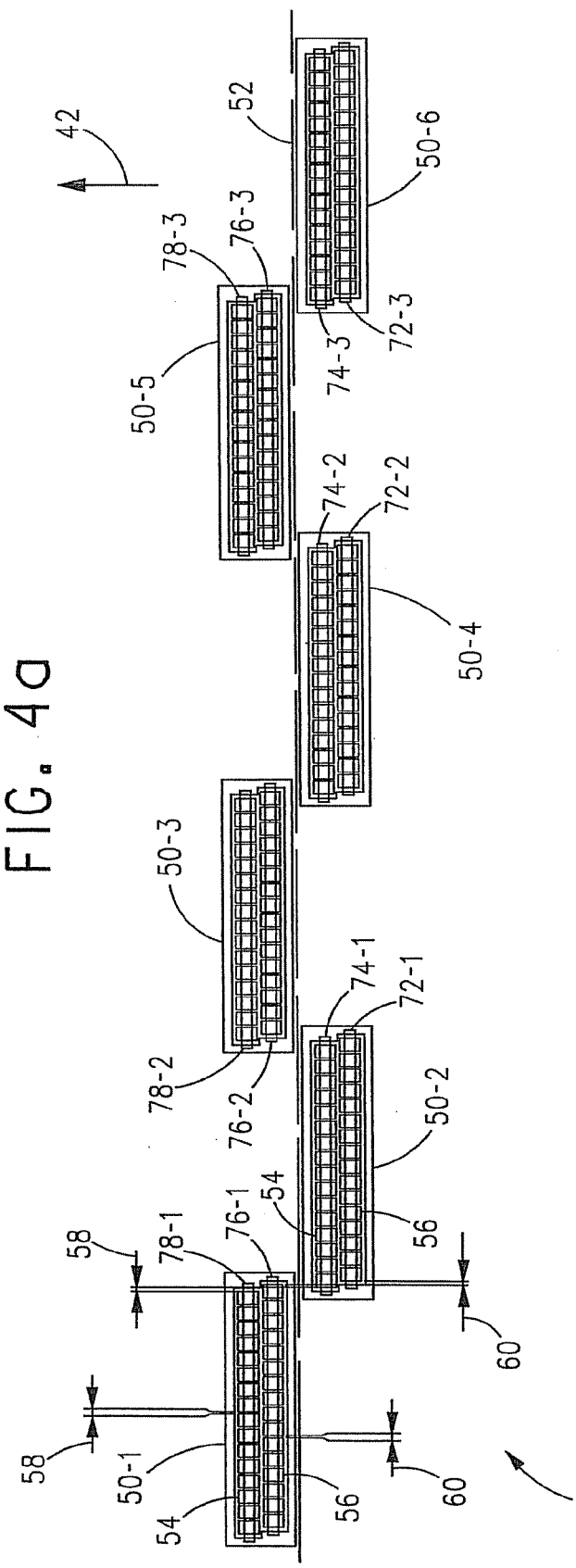

With reference to FIGS. 4a and 4b, a second embodiment collimator 16 and a second embodiment detector array 12 are shown. The second embodiment detector array 12 shown in FIG. 4b includes a plurality of radiation detectors 50 arranged in an alternating or staggered pattern on opposite sides of a line 52 (shown in phantom). More specifically, the second embodiment detector array 12 shown in FIG. 4b includes a first set of radiation detectors 50-1, 50-3 and 50-5 spaced end-to-end from each other on a first side of line 52 and a second set of radiation detectors 50-2, 50-4 and 50-6 spaced end-to-end from each other on a second side of line 52.

Each radiation detector 50 includes a first set of pixels 54 and a second set of pixels 56, both sets of which are spaced side-to-side in a direction parallel to each other and parallel to line 52. Pixels 54 of each radiation detector 50 are offset with respect to pixels 56 of the radiation detector 50 in a direction parallel to line 52. Adjacent pixels 54 of each radiation detector 50 are spaced from each other a distance 58 in a direction parallel to line 52 and adjacent pixels 56 of each radiation detector 50 are spaced from each other a distance 60 away from each other in a direction parallel to line 52. Pixels 54 of each radiation detector 50 are offset with respect to pixels 56 of the radiation detector 50 such that, in a direction perpendicular to line 52, one pixel 54 is positioned in alignment with each gap 60 between adjacent pairs of pixels 56. Similarly, perpendicular to line 52, one pixel 56 is in alignment with each gap 58 between each adjacent pairs of pixels 54. Thus, when moving in a direction from left to right, or vice versa, in a direction parallel to line 52 between the ends of second embodiment detector array 12, one alternately encounters pixels 54 and 56.

The rightmost edge of the rightmost pixel 54 of radiation detector 50-1 and the leftmost edge of the leftmost pixel 54 of radiation detector 50-2 are positioned distance 58 apart in a direction parallel to line 52. Similarly, the rightmost edge of the rightmost pixel 56 of radiation detector 50-1 and the leftmost edge of the leftmost pixel 56 of radiation detector 50-2 are positioned distance 60 apart in a direction parallel to line 52. Moreover, the rightmost edges of the rightmost pixels 54 and 56 of radiation detector 50-2 and the leftmost edges of the leftmost pixels 54 and 56 of radiation detector 50-3 are spaced distances 58 and 60, respectively, from each other in a direction parallel to line 52; the rightmost edges of the rightmost pixels 54 and 56 of radiation detector 50-3 and the leftmost edges of the leftmost pixels 54 and 56 of radiation detector 50-4 are positioned distances 58 and 60, respectively, from each other; and so forth for radiation detector pairs 50-4 and 50-5; and 50-5 and 50-6.

The second embodiment collimator 16 shown in FIG. 4a includes four sets 62, 64, 66 and 68 of three slots each formed in a plate 70, like plate 30. When second embodiment detector array 12 and second embodiment collimator 16 are utilized in the manner disclosed above in connection with FIGS. 1 and 2, radiation traversing transmission path 14 and passing through slots 62-1, 62-2 and 62-3 define radiation patterns 72-1, 72-2 and 72-3, respectively, on pixels 56 of radiation detectors 50-2, 50-4 and 50-6, respectively. Similarly, radiation passing through slot 64-1, 64-2 and 64-3 define radiation patterns 74-1, 74-2 and 74-3 on pixels 54 of radiation detectors 50-2, 50-4 and 50-6, respectively. Similar comments apply in respect of slots 66-1, 66-2 and 66-3; and 68-1, 68-2 and 68-3 and radiation patterns 76-1, 76-2 and 76-3; and 78-1, 78-2 and 78-3 formed on pixels 54 and 56 of radiation detectors 50-1, 50-3 and 50-5, respectively.

The use of the second embodiment detector array 12 and the second embodiment collimator 16 in inspection system 2 shown in FIGS. 1 and 2 will now be described.

At a time t1 when slice 44 of food product 6 is positioned in the path of radiation that traverses transmission path 14 and forms radiation patterns 72-1, 72-2 and 72-3, the outputs of pixels 56 of radiation detectors 50-2, 50-4 and 50-6 are sampled.

At a time t2, after conveyor belt 4 has translated slice 44 of food product 6 to a position where slice 44 is positioned in the path of radiation that traverses transmission path 14 and forms radiation patterns 74-1, 74-2 and 74-3, the outputs of pixels 54 of radiation detectors 50-2, 50-4 and 50-6 are sampled.

At a time t3, after conveyor belt 4 has translated slice 44 of food product 6 to a position where slice 44 is positioned in the path of radiation that traverses transmission path 14 and forms radiation patterns 76-1, 76-2 and 76-3, the outputs of pixels 56 of radiation detectors 50-1, 50-3 and 50-5 are sampled.

Lastly, at a time t4, after conveyor belt 4 has translated slice 44 of food product 6 to a position where slice 44 is positioned in the path of the radiation that traverses transmission path 14 and forms radiation pattern 78-1, 78-2 and 78-3, the outputs of pixels 54 of radiation detectors 50-1, 50-3 and 50-5 are sampled.

Controller 18 assembles the thus sampled outputs of pixels 54 and 56 of radiation detectors 50-1 through 50-6 acquired at times t1 through t4 into a composite image of slice 44. Because of the arrangement of radiation detectors 50-1 through 50-6 and the arrangement of the pixels 54 and 56 thereof, the composite image of slice 44 has a greater coverage and, hence, greater resolution than the composite image obtained utilizing the first embodiment collimator 16 and the first embodiment detector array 12 shown in FIGS. 3a and 3b, respectively. This greater coverage and resolution results from the arrangement of pixels 54 and 56 of each radiation detector 50 whereupon, in a direction perpendicular to line 52, each pixel 54 is aligned with the gap between adjacent pixels 56, and vice versa. Thus, for example, if a portion of slice 44 is not detected due to the presence of a gap 60 between adjacent pixels 56 of one or a pair of adjacent radiation detectors 50, said portion of said slice 44 will be detected by a pixel 54 in alignment with said gap 60. Moreover, if a portion of a slice 44 is not detected due to the presence of a gap 58 between adjacent pixels 54 of one or a pair of adjacent radiation detectors 50, said portion of said slice 44 will be detected by a pixel 56 in alignment with said gap 58.

By way of appropriate imaging software, controller 18 assembles a composite image of slice 44 from the thus sampled outputs of the pixels 54 and 56 of radiation detectors 50-1 through 50-6 acquired at times t1 through t4, desirably taking into account any overlap in images formed from the outputs of pixels 54 and 56 acquired at any combination of times t1 through t4.

To facilitate controller 18 forming a composite image of each slice of food product 6, suitable means, such as an encoder and/or resolver, (not shown) is/are coupled to controller 18 and conveyor belt 4 for accurately detecting the movement and/or speed of conveyor belt 4. Armed with knowledge of the position and/or speed of conveyor belt 4, controller 18 can be operative for acquiring and combining images of different portions of the same slice acquired at different times (t1 through t4) into the composite image of said slice.

In a similar manner, based on information regarding the position and/or speed of conveyor belt 4, controller 18 can be operative for acquiring and assembling images of a plurality of adjacent slices of food product 6 into a composite image of food product 6. Thus, in addition to assembling composite images of each slice of food product 6, controller 18 can assemble a composite image of all or a portion of food product 6 from the images of the slices of food product 6 acquired and assembled by controller 18.

Figure 5A:
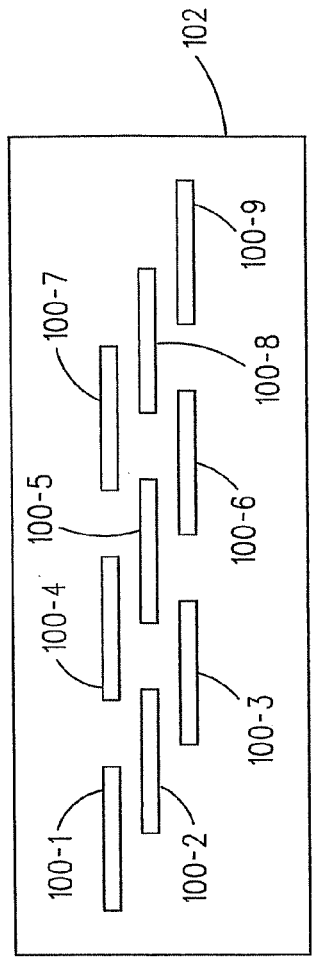
FIGS. 5a and 5b are a third embodiment collimator and a third embodiment radiation detector array for use with the inspection system shown in FIGS. 1 and 2.
Figure 5B:
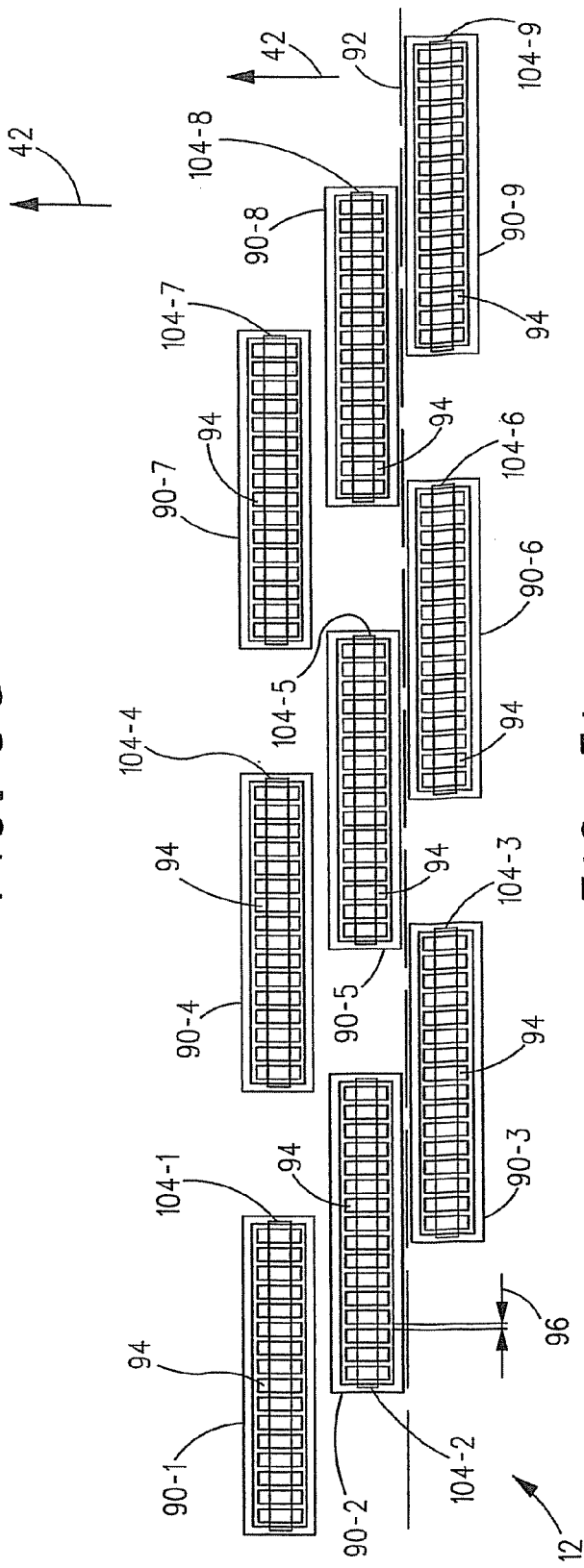

With reference to FIGS. 5a and 5b, a third embodiment collimator 16 and a third embodiment detector array 12 are shown. The third embodiment detector array 12 shown in FIG. 5b includes a plurality of radiation detectors 90 arranged in an alternating or staggered pattern in a direction parallel to a line 92. More specifically, third embodiment detector array 12 includes a first set of radiation detectors 90-3, 90-6 and 90-9 spaced end-to-end from each other in a direction parallel to line 92 on a first side thereof. Third embodiment detector array 12 also includes a second set of radiation detectors 90-2, 90-5 and 90-8 spaced end-to-end from each other in a direction parallel to line 92 on a second side thereof. Lastly, third embodiment detector array 12 includes a third set of radiation detectors 90-1, 90-4 and 90-7 spaced end-to-end from each other in a direction parallel to line 92. The third set of radiation detectors, however, are positioned on a side of the second set of radiation detectors opposite line 92.

Each radiation detector 90 includes a plurality of pixels 94 spaced side-to-side from each other by a gap of distance 96 in a direction parallel to line 92. Radiation detectors 90-1 through 90-9 are positioned such that, in a direction perpendicular to line 92, a pixel 94 of one of radiation detectors 90-1, 90-3, 90-4, 90-6, 90-7 or 90-9 is in alignment with each gap of distance 96 between adjacent pixels 94 of radiation detectors 90-2, 90-5 and 90-8. Thus, when food product 6 is translated by conveyor belt 4 in the direction shown by arrow 42 in FIGS. 1 and 5b, the portion of each slice 44 between opposite ends of the second set of radiation detectors 90-2, 90-5 and 90-8 will be imaged by radiation detected by pixels 94 of radiation detectors 90-1 through 90-9. To this end, as can be seen in FIG. 5b, the portion of radiation detector 90-1 that extends to the left of the leftmost end of radiation detector 90-2 and the portion of radiation detector 90-9 that extends to the right of the rightmost end of radiation detector 90-8 include adjacent pixels 94 where each gap of distance 96 therebetween has no corresponding pixel 94 of another radiation detector 90 in alignment therewith in a direction perpendicular to line 92.

The third embodiment collimator 16 shown in FIG. 5a includes a plurality of slots 100-1 through 100-9 formed in a plate 102, like plate 30 described above. Slots 100-1 through 100-9 are arranged in the same pattern as radiation detectors 90-1 through 90-9. When third embodiment collimator 16 and third embodiment detector array 12 are utilized in the manner disclosed above in connection with FIGS. 1 and 2, radiation traversing transmission path 14 that passes through slots 100-1 through 100-9 forms radiation patterns 104-1 through 104-9 on radiation detectors 90-1 through 90-9, respectively.

The use of the third embodiment detector array 12 and the third embodiment collimator 16 in inspection system 2 shown in FIGS. 1 and 2 will now be described.

At time t1 when slice 44 of food product 6 is positioned in the path of radiation that traverses radiation path 14 and forms radiation patterns 104-3, 104-6 and 104-9, the outputs of pixels 94 of radiation detectors 90-3, 90-6 and 90-9 are sampled.

At time t2, after conveyor belt 4 has translated slice 44 of food product 6 to a position where said slice 44 is positioned in the path of radiation that traverses transmission path 14 and forms radiation patterns 104-2, 104-5 and 104-8, the outputs of pixels 94 of radiation detectors 90-2, 90-5 and 90-8 are sampled.

Lastly, at a time t3, after conveyor belt 4 has translated slice 44 of food product 6 to a position where said slice 44 is positioned in the path of radiation that traverses transmission path 14 and forms radiation patterns 104-1, 104-4 and 104-7, the outputs of pixels 94 of radiation detectors 90-1, 90-4 and 90-7 are sampled.

Controller 18 assembles the thus sampled outputs of pixels 94 of radiation detectors 90-1 through 90-9 acquired at times t1 through t3 into a composite image of slice 44. More specifically, by way of appropriate imaging software, controller 18 assembles a composite image of slice 44 from the thus sampled outputs of pixels 94 of radiation detectors 90-1 through 90-9 acquired at times t1 through t3, taking into account any overlap in images formed from the outputs of pixels acquired at any combination of times t1 through t3.

To facilitate controller 18 forming the composite image of each slice of food product 6, suitable means, such as an encoder and/or resolver, (not shown) is/are coupled to controller 18 and conveyor 4 for accurately detecting the movement and/or speed of conveyor belt 4. Armed with knowledge of the position and/or speed of conveyor belt 4, controller 18 can be operative for acquiring and combining images of difference portions of the same slice acquired at different times (t1 through t3) into the composite image of said slice.

In a similar manner, based on information regarding the position and/or speed of conveyor belt 4, controller 18 can be operative for acquiring and assembling images of a plurality of adjacent slices of food product 6 into a composite image of food product 6. Thus, in addition to assembling composite images of each slice of food product 6, controller 18 can assemble a composite image of the entirety of food product 6 from images of the slices of food product 6 acquired and assembled by controller 18.

It is envisioned that adjacent pixels 94 of radiation detectors 90-1 and 90-9 that reside to the left and right of the leftmost and rightmost ends of radiation detectors 90-2 and 90-8, respectively, may also be utilized to acquire images of slices 44 of food product 6. However, it is to be recognized that because there is no pixel 94 in alignment with each gap of distance 96 between said adjacent pixels 94 of radiation detectors 90-1 and 90-9, each portion of each slice of food product 6 in alignment with said gap may not be fully visible in the composite image because of said gap.

As can be seen, the present invention is a radiation inspection system, wherein radiation detectors are arranged in a novel and non-obvious pattern that avoids the formation of a gap between an end pixel of one radiation detector and an adjacent end pixel of an adjacent radiation detector when said radiation detectors are positioned end-to-end. In addition, the second and third embodiment detector arrays 12 and the second and third embodiment collimators 16 also enable a composite image of each slice 44 of food product 6 to be formed without the presence of pixel gaps in all or part of said composite image.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A radiation inspection system comprising:
  a first set of semiconductor radiation detectors spaced apart from one another in a first direction;
  a second set of semiconductor radiation detectors spaced apart from one another in the first direction, wherein:
  each of said radiation detectors includes a first plurality of pixels spaced apart from one another in said first direction and a second plurality of pixels spaced apart from one another in said first direction;
  said second plurality of pixels is positioned laterally adjacent said first plurality of pixels;
  said pixels of said first and second pluralities of pixels of each of said radiation detectors are arranged in an alternating or staggered pattern in said first direction;
  each of said pixels is operative for outputting a current or voltage pulse in response to radiation from a radiation source striking said pixel;
  said second set of radiation detectors is positioned laterally adjacent said first set of radiation detectors; and
  said radiation detectors are arranged in an alternating or staggered pattern in said first direction.

2. The system of claim 1, wherein:
adjacent pixels of each of said plurality of pixels of each radiation detector are spaced apart from one another by a first distance in said first direction; and
one pixel of said first set of radiation detectors and one pixel of said second set of radiation detectors are spaced said first distance apart from one another in said first direction.

3. The system of claim 1, wherein:
next to each space between adjacent radiation detectors of the first set of radiation detectors is positioned one radiation detector of the second set of radiation detectors; and
next to each space between adjacent radiation detectors of the second set of radiation detectors is positioned one radiation detector of the first set of radiation detectors.

4. The system of claim 3, wherein the extent or length of each space in the first direction is less than the extent or length in the first direction of the radiation detector positioned next to said space.

5. The system of claim 3, wherein the ends of each radiation detector positioned next to a space are positioned adjacent the radiation detectors that define the space.

6. The system of claim 1, further including a collimator including slots having a pattern corresponding to the patterns of the first and second plurality of pixels of the first and second sets of radiation detectors.

7. The system of claim 6, wherein the collimator is positioned in a path of the radiation such that each plurality of pixels receives radiation from the radiation source via one slot of the collimator.

8. The system of claim 7, further including:
a transport system for translating a specimen in a direction laterally to the first direction between the radiation source and the radiation detectors; and
a controller operative for acquiring the output of each pixel and for forming from said acquired output a composite image of the passage of radiation through the object.

9. The system of claim 1, wherein, moving in the first direction, radiation detectors are encountered in the following order:
a first radiation detector of the first set of radiation detectors;
a first radiation detector of the second set of radiation detectors;
a second radiation detector of the first set of radiation detectors; and
a second radiation detector of the second set of radiation detectors.

10. A radiation inspection system comprising:
a first set of semiconductor radiation detectors spaced apart from one another in a first direction;
a second set of semiconductor radiation detectors spaced apart from one another in said first direction; and
a third set of semiconductor radiation detectors spaced apart from one another in said first direction, wherein:
said second set of radiation detectors is positioned laterally adjacent said first set of radiation detectors;
radiation detectors of said first and second sets of radiation detectors are arranged in an alternating or staggered pattern in said first direction;
said third set of radiation detectors is positioned laterally adjacent said second set of radiation detectors on a side thereof opposite said first set of radiation detectors;
said radiation detectors of said second and third sets of radiation detectors are arranged in an alternating or staggered pattern in said first direction; and
said radiation detectors of said first and third sets of radiation detectors are arranged in an alternating or staggered pattern in said first direction, wherein an object moving in said first direction, radiation detectors are encountered in the following order:
a first radiation detector of said first set of radiation detectors;
a first radiation detector of said second set of radiation detectors;
a first radiation detector of said third set of radiation detectors;
a second radiation detector of said first set of radiation detectors;
a second radiation detector of said second set of radiation detectors; and
a second radiation detector of said third set of radiation detectors.

11. The system of claim 10, further including a collimator having first, second and third sets of slots having a pattern corresponding to the pattern of the first, second and third sets of radiation detectors.

12. The system of claim 11, wherein the collimator is positioned in a path of output radiation such that each radiation detector receives radiation via one slot of the collimator and the collimator blocks the passage of radiation that would not be received by a radiation detector.

13. The system of claim 10, wherein:
each of said radiation detectors includes at least one plurality of pixels spaced apart from one another in said first direction;
each of said pixels is operative for outputting a current or voltage pulse in response to radiation from the radiation source striking said pixel, and further including:
a radiation source operative for outputting radiation along a transmission path;
a collimator disposed in the transmission path between said radiation source and said plurality of radiation detectors, said collimator having a plurality of slots for the passage of radiation from said radiation source to said plurality of radiation detectors, with each of said slots permitting passage of radiation to one of said radiation detectors;
a transport system for translating an object between said radiation source and said plurality of radiation detectors in a direction lateral to the direction of said transmission path; and
a controller operative for acquiring the output of each pixel of said radiation detectors and for forming from said acquired output a composite image of the passage of radiation through said object.

14. The system of claim 10 wherein:
each radiation detector includes at least one plurality of pixels spaced from each other in the first direction; and
the first, second, and third sets of radiation detectors are positioned such that at least some of the pixels of said pluralities of pixels of the first, second, and third radiation detectors are arranged in an alternating or staggered pattern in the first direction.

* * * * *